US011984243B2

(12) United States Patent
Parker et al.

(10) Patent No.: US 11,984,243 B2
(45) Date of Patent: May 14, 2024

(54) HIGH PERFORMANCE MAGNETS

(71) Applicants: UT-Battelle, LLC, Oak Ridge, TN (US); Iowa State University Research Foundation, Inc., Ames, IA (US)

(72) Inventors: David S. Parker, Oak Ridge, TN (US); Tribhuwan Pandey, Oak Ridge, TN (US); Cajetan Ikenna Nlebedim, Ames, IA (US); Xubo Liu, Ames, IA (US)

(73) Assignees: UT-BATTELLE, LLC, Oak Ridge, TN (US); Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 17/685,672

(22) Filed: Mar. 3, 2022

(65) Prior Publication Data

US 2022/0285057 A1 Sep. 8, 2022

Related U.S. Application Data

(60) Provisional application No. 63/156,586, filed on Mar. 4, 2021.

(51) Int. Cl.
*H01F 1/055* (2006.01)
*H01F 41/02* (2006.01)

(52) U.S. Cl.
CPC ......... *H01F 1/055* (2013.01); *H01F 41/0293* (2013.01)

(58) Field of Classification Search
None
See application file for complete search history.

(56) References Cited

PUBLICATIONS

Ke (Physical Review B, vol. 94, 2016, No. 144429). (Year: 2016).*

Saito, (Journal of Alloys and Compounds, vol. 585, 2014, p. 423-427). (Year: 2014).*

Choudhary (Journal of Alloys and Compounds, vol. 839, 2020, 155549). (Year: 2020).*

Schaller (J. Appl. Phys., vol. 43, p. 3161-3164, 1972). (Year: 1972).*

Mimura (Material Science and Engineering, vol. A 334, p. 127-133, 2002). (Year: 2022).*

* cited by examiner

*Primary Examiner* — Xiaowei Su
(74) *Attorney, Agent, or Firm* — WARNER NORCROSS + JUDD LLP

(57) ABSTRACT

Permanent magnet materials are provided. The permanent magnet materials are cerium based materials including zirconium and iron in combination with cobalt. The permanent magnet materials may have the formula $Ce_2ZrFe_{15-x}Co_x$ wherein 6≤x≤15. In some embodiments, the permanent magnet materials have the formula $Ce_{2+y}Zr_{1-y}Fe_{(15-x)(2-z)/2)}Co_xCu_{((15-x)z/2)}$ wherein 6≤x≤15, 0≤y≤0.4, and z=0 or 1. In other embodiments, the permanent magnet materials have the formula $Ce_2Zr_x(Fe_{1-y}Co_y)_{17-2x}$, where 0<x≤1 and 0.4≤y≤1. Permanent magnets including the permanent magnet materials are also provided.

13 Claims, 2 Drawing Sheets

| | |
|---|---|
| 001 | $Ce_2ZrCo_9Fe_6$ |
| 002 | $Ce_2ZrCo_9Fe_3Cu_3$ |
| 003 | $Ce_{2.4}Zr_{0.6}Co_9Fe_3Cu_3$ |

| | |
|---|---|
| 004 | $Ce_2ZrCo_9Fe_6$ + TiC 2%wt |
| 005 | $Ce_2ZrCo_9Fe_3Cu_3$ + TiC 2%wt |
| 006 | $Ce_{2.4}Zr_{0.6}Co_9Fe_3Cu_3$ + TiC 2%wt |

HIGH PERFORMANCE MAGNETS

CROSS-REFERENCE TO RELATED APPLICATIONS

This application claims the benefit of U.S. Provisional Application 63/156,586, filed Mar. 4, 2021, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 and Contract No. DE-AC02-07CH11358 awarded by the U.S. Department of Energy. The government has certain rights in the invention.

FIELD OF THE INVENTION

The present invention relates to high performance magnets, and particularly to a strong permanent magnet having a reduced critical rare-earth element content, for use in hybrid and battery-powered electric vehicles, electric motors, wind turbines, computer hardware, and other applications.

BACKGROUND OF THE INVENTION

Strong permanent magnets have a variety of important uses in modern technology ranging from automotive (for both petroleum-fueled and electric vehicles) to power generation (such as wind turbine generators) to computer hard disk drives and electric motors, to name a few. Some well-known permanent magnets rely on certain rare-earth elements such as neodymium, samarium, and dysprosium for their composition. However, these rare-earth elements are in limited supply, and are difficult and expensive to obtain. Cerium is a rather abundant and relatively inexpensive rare earth metal. Cerium based magnetic compounds are thus attractive for permanent magnet applications, if sufficient magnetic anisotropy can be achieved.

Cerium forms many interesting magnetic compounds with the transition metals iron (Fe) and cobalt (Co) such as $CeCo_5$, $Ce_2Fe_{17}$, and $Ce_2Co_7$. Among these, $CeCo_5$ has shown potential for possible applications due to its relatively high Curie point (653 K) and large uniaxial magnetic anisotropy (9.5 $MJ/m^3$). $Ce_2Co_{17}$ on the other hand, despite its very high Curie point (1023 K) and large saturation moment (1.1 T), remains a rather inferior magnet due to its rather small uniaxial magnetic anisotropy energy (MAE). The poor MAE of $Ce_2Co_{17}$ stems from the negative contribution of the Co atoms occupying the "dumbbell" site in the rhombohedral structure. The MAE may be improved by substitutions at the dumbbell site, which causes a substantial lattice relaxation. However, there is a significant downside of this substitution at the dumbbell site—a penalty to the magnetization. The highest magnetic moment for Co atoms in the $Ce_2Co_{17}$ rhombohedral structure is observed at the dumbbell site, and substitution of a nonmagnetic metal such as zirconium (Zr) reduces the already relatively poor magnetic moment drastically.

Therefore, a need exists for strong permanent magnets that are composed of more abundant non-critical rare-earth elements such as cerium, but which are equal to or exceed the magnetic properties of known state-of-the-art permanent rare-earth metal magnets.

SUMMARY OF THE INVENTION

Improved, high performance permanent magnet materials are provided. The permanent magnet materials are zirconium doped cerium iron cobalt alloys that avoid the use of scarce rare-earth elements such as neodymium and samarium which are required in state-of-the-art permanent magnets. The improved permanent magnet materials have a high magnetic anisotropy without sacrificing the magnetic moment of the materials. The permanent magnet materials therefore may compete with conventional permanent magnets at a lower cost in industries such as transportation and power generation.

In specific embodiments, the permanent magnet material having the formula $Ce_2ZrFe_{15-x}Co_x$ wherein $6 \leq x \leq 15$. In particular embodiments, the permanent magnet material having the formula $Ce_2ZrFe_{15-x}Co_x$ wherein x=9.

In specific embodiments, Ce is in a trivalent ($Ce^{3+}$) state.

In specific embodiments, the permanent magnet material may further include one or more of Hf, Ti, and W partially substituted for Zr.

In specific embodiments, the permanent magnet material may further include TiC in an amount in the range of between 0 and 4% by weight.

In specific embodiments, the material has a magnetic anisotropy energy (MAE) of greater than 0 $MJ/m^3$ (more preferably greater than 5 $MJ/m^3$), a total magnetization of greater than $21\mu_B$ per formula unit (more preferably greater than $27\mu_B$ per formula unit), the material has an energy of formation ($E^{for}$) less than −80.0 meV/atom (more preferably less than −100.0 meV/atom), and/or the material has a maximum energy product ($BH_{max}$) of greater than 30 MGOe (more preferably greater than 40 MGOe).

In specific embodiments, the material further includes Cu partially substituted for Fe. In particular embodiments, the material has the formula $Ce_{2+y}Zr_{1-y}Fe_{(15-x)(2-z)/2}Co_x Cu_{((15-x)z/2)}$ wherein $6 \leq x \leq 15$, $0 \leq y \leq 0.4$, and z=0 or 1. In certain embodiments, x=9, y=0, and z=1. In other embodiments, x=9, y=0.4, and z=1.

In specific embodiments, the permanent magnet material has the formula $Ce_2Zr_x(Fe_{1-y}Co_y)_{17-2x}$, where $0<x \leq 1$ and $0.4 \leq y \leq 1$.

A permanent magnet including the improved permanent magnet material is also provided. In specific embodiments, the permanent magnet includes an amount of one or more of Hf, Ti, Ni, and inadvertent impurities.

These and other features of the invention will be more fully understood and appreciated by reference to the description of the embodiments and the drawings.

DETAILED DESCRIPTION OF THE CURRENT EMBODIMENTS

As discussed herein, the current embodiments provide Ce—Zr—Fe—Co alloys that have both a large MAE and a high magnetic moment. The current embodiments begin with $Ce_2Fe_{17}$, a compound with approximately 50% larger total magnetization than $Ce_2Co_{17}$, though it suffers from planar MAE (and is in fact a helimagnet rather than a ferromagnet) which does not change its sign even after Zr substitution at dumbbell site. By substituting Co for Fe, the MAE is tuned to a very large uniaxial value of 7.8 MJ/m$^3$ at 60% Co alloying with relatively little sacrifice in magnetic moment.

Figure 1A:
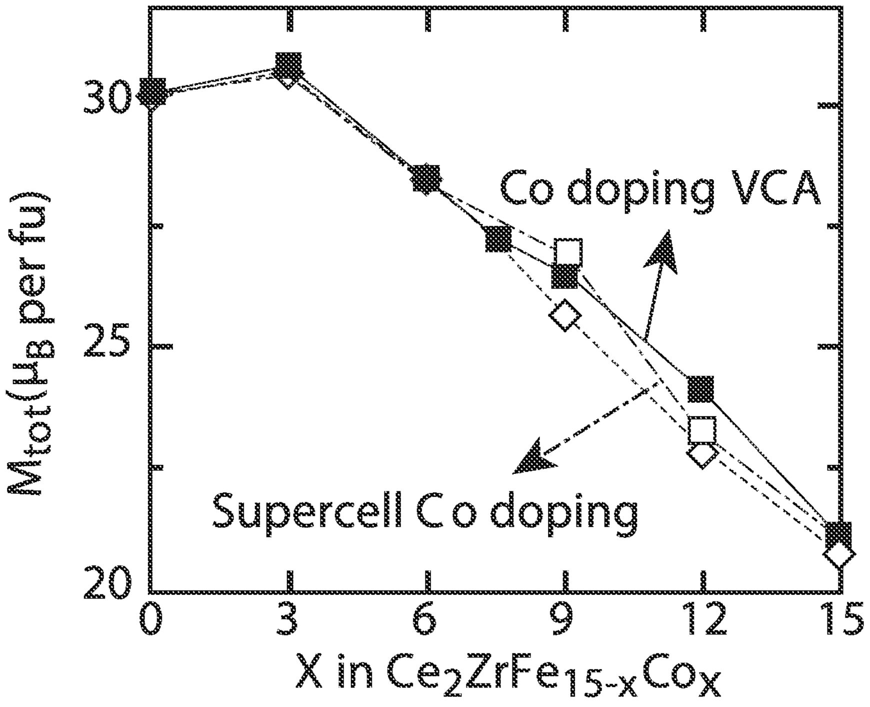
FIG. 1A is a graph of total calculated magnetization of specific embodiments of the permanent magnet materials as a function of the iron/cobalt composition of the magnet material.
Figure 1B:
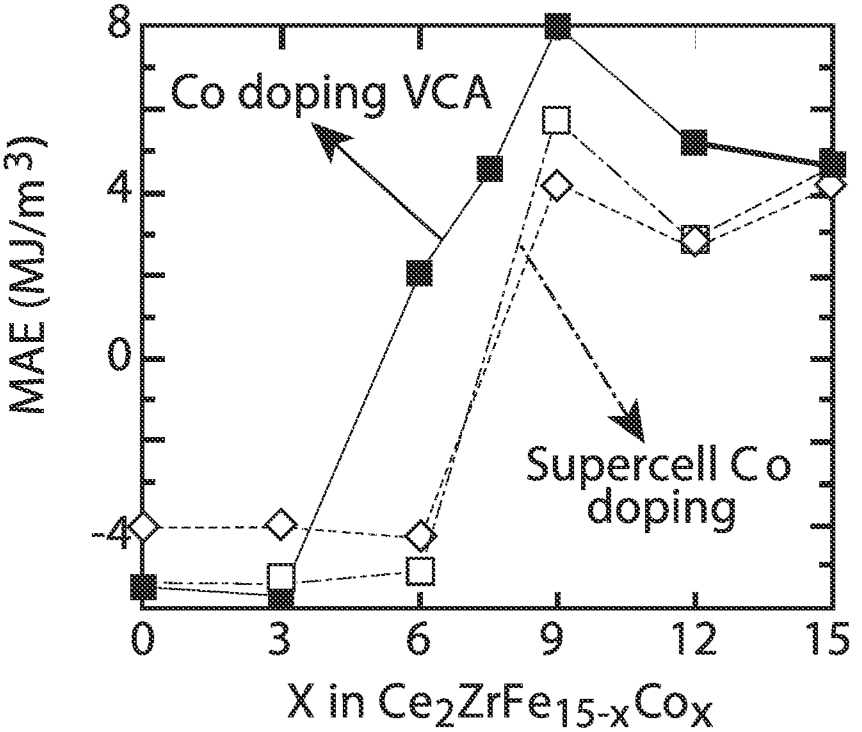
FIG. 1B is a graph of calculated magnetic anisotropy energy of specific embodiments of the permanent magnet materials as a function of the iron/cobalt composition of the magnet material.

More particularly, in specific embodiments the permanent magnet material has the formula $Ce_2ZrFe_{15-x}Co_x$ wherein 6≤x≤15. As shown in FIGS. 1(*a*) and 1(*b*), when x is 6 or greater, the magnetic crystalline anisotropy (MAE) is greater than zero. Any value of MAE above zero is acceptable. Also, while the total magnetization is maximized at a value of x equal to 3, the total magnetization is still in the range of approximately 21 to 27$\mu_B$ per formula unit when 6≤x≤15. In one embodiment, the permanent magnet material has the formula $Ce_2ZrFe_6Co_9$ which exhibits a high MAE and a corresponding total magnetization of approximately 25. Alternatively, the permanent magnet material may have the formula $Ce_2Zr_x(Fe_{1-y}Co_y)_{17-2x}$, where 0<x≤1 and 0.4≤y≤1.

In other specific embodiments of the permanent magnet material, copper may be partially substituted for iron and/or the ratio of cerium to zirconium may also be varied. For example, the permanent magnet material may have the formula $Ce_{2+y}Zr_{1-y}Fe_{(15-x)(2-z)/2)}Co_xCu_{((15-x)z/2)}$ wherein 6≤x≤15, 0≤y≤0.4, and z=0 or 1. For example, the permanent magnet material may have the formula $Ce_2ZrCo_9Fe_3Cu_3$ (x=9, y=0, and z=1) or the formula $Ce_{2.4}Zr_{0.6}Co_9Fe_3Cu_3$ (x=9, y=0.4, and z=1).

The permanent magnet material may include a certain amount of hafnium, titanium and/or tungsten mixed with and substituted for zirconium. The amount of hafnium, titanium and/or tungsten may be in the range of 0 to 10% by weight relative to total amount of zirconium and hafnium and/or titanium. Hafnium and titanium are chemically similar to zirconium and may be present in the production of zirconium as hafnium and titanium are naturally found with zirconium during mining processes. Other trace amounts (e.g. 0 to 2% by weight) of incidental impurities such as but not limited to lanthanum, samarium, nickel, manganese, silicon, calcium, magnesium, sulfur, phosphorus, tungsten, molybdenum, tantalum, chromium, gallium and niobium may also be included in the permanent magnet material. These incidental impurities may already be present in the raw materials or admixed during the production process. Additionally, the permanent magnet material may include trace amounts of other inadvertent impurities such as oxygen, nitrogen, carbon, and calcium.

The effectiveness of the permanent magnet materials is exemplified by the following calculated properties. As a baseline, the magnetic properties of base compounds $Ce_2Fe_{17}$ and $Ce_2Co_{17}$ were calculated. $Ce_2Fe_{17}$ was modeled as a ferromagnet, despite the experimental presence of helimagnetism; as the region of interest for permanent magnets is generally on the Co-rich side of these compositions (where ferromagnetic behavior indeed prevails). This does not introduce appreciable error.

With respect to the methodology of the calculations, all first principles calculations were performed within density functional theory (DFT) using the general potential linearized augmented plane-wave (LAPW) method and local orbitals as implemented in the WIEN2K code. The LAPW sphere radii were set to 2.30 Bohr for Ce and 1.83 Bohr for Fe, Co, and Zr. In addition, $RK_{max}$ (the product of the smallest LAPW sphere radius (R) and the interstitial plane-wave cutoff, $K_{max}$) of 9.0 was used to ensure a well-converged basis set. The calculations for $Ce_2Fe_{17}$ and $Ce_2Co_{17}$ were performed using the experimental lattice parameters with internal coordinates relaxed. It was shown that upon Zr substitution at the dumbbell site (1 Zr→$Co_2$ or $Fe_2$), the volume of the unit changes by less than 2%. The calculations for $Ce_2Fe_{15}Zr$ and $Ce_2Co_{15}Zr$ were also performed at the experimental lattice parameters of the corresponding base compounds. The Co alloying at selected concentrations between $Ce_2Fe_{15}Zr$ and $Ce_2Co_{15}Zr$ was modeled within virtual crystal approximation (VCA). For the alloyed system $Ce_2Fe_{15-x}Co_xZr$ the lattice parameters were modified according to Vegard's law. For all the systems, internal atomic coordinates were determined by minimizing the total energy using the generalized gradient approximation (GGA) until forces on all the atoms were less than 1 mRy/Bohr. For this purpose, 1000 reducible k-points were used in the full Brillouin zone. Although VCA correctly predicts the magnetic moments it can overestimate the MAE. To address this issue, the Co doping in $Ce_2Fe_{15}Zr$ was also studied using the super-cell method.

For the calculation of magnetic crystalline anisotropy (MAE), spin-orbit coupling was included within the standard second variational approach. MAE calculations were performed by using 2000 k-points. To check the convergence of MAE with respect to the number of k-points, additional calculations were performed with 3000 k-points. Upon this change, the MAE varied only by approximately 3%, demonstrating the excellent convergence of these calculations. All the calculations presented here correspond to 2000 k-points. As is well known, magnetic properties of rare earth based materials are often not described correctly within standard GGA calculations, as within this approach the rare earth f-states are often incorrectly located at the Fermi level. To eliminate this common error, in the present calculations the rare earth f orbitals were described within the GGA+U formalism, which adds a Hubbard U parameter and the Hund's coupling parameter J to split the localized f orbitals above and below the Fermi level. Here the Coulomb correlations within the Ce-4f localized orbitals were described using the self-interaction correction scheme, which only depends on $U_{eff}$=U−J. Here, a value of U−J=3 eV for Ce was used.

The corresponding calculated magnetic moments and MAE values are listed in Table 1 below.

TABLE 1

The calculated spin magnetic moments at various atomic sites, total (spin + orbital) magnetic moment and magnetic anisotropy calculated within the GGA by including spin orbit coupling with a Hubbard U parameter of 3 eV at Ce site. Calculation for $Ce_2Fe_{17}$ ($Ce_2Fe_{17}$), and corresponding Zr doped compounds were performed at the experimental lattice parameters. The calculated formation energies ($E^{for}$) with respect to elemental decomposition are also shown. The $E^{for}$ is calculated without spin orbital coupling and without U. For the alloyed systems, lattice parameters were scaled according to Vegard's law. All the lattice parameters employed herein are listed below.

| | Compounds | | | | | | | |
|---|---|---|---|---|---|---|---|---|
| Parameter | $Ce_2Fe_{17}$ | $Ce_2Fe_{15}Zr$ | $Ce_2Fe_{12}Co_3Zr$ | $Ce_2Fe_9Co_6Zr$ | $Ce_2Fe_6Co_9Zr$ | $Ce_2Fe_3Co_{15}Zr$ | $Ce_2Co_{15}Zr$ | $Ce_2Co_{17}$ |
| a (Å) | 8.489 | 80489 | 8.468 | 8.447 | 8.425 | 8.404 | 8.383 | 8.383 |
| c (Å) | 12.408 | 12.408 | 12.371 | 12.334 | 12.297 | 12.260 | 12.223 | 12.223 |
| $\mu_{Ce}$ ($\mu_B$) | −0.66 | −0.48 | −0.52 | −0.92 | −0.90 | −0.85 | −0.80 | −0.96 |
| $\mu_{Zr}$ ($\mu_B$) | −0.27 | −0.28 | −0.28 | −0.28 | −0.27 | −0.24 | | |
| $\mu_{Fe\text{-}6c}$ ($\mu_B$) | 2.56 | | | | | | | 1.70 |
| $\mu_{Fe\text{-}9d}$ ($\mu_B$) | 2.05 | 2.04 | 2.17 | 2.05 | 1.91 | 1.73 | 1.54 | 1.08 |
| $\mu_{Fe\text{-}18f}$ ($\mu_B$) | 2.36 | 2.20 | 2.14 | 2.02 | 1.85 | 1.64 | 1.41 | 1.60 |
| $\mu_{Fe\text{-}18h}$ ($\mu_B$) | 2.22 | 2.13 | 2.20 | 2.10 | 1.94 | 1.75 | 1.54 | 1.56 |
| $M_s$ ($\mu_B$/ per u.c) | 38.04 | 30.26 | 30.77 | 28.92 | 27.15 | 24.12 | 21.14 | 25.88 |
| $K_1$ (MJ/m$^3$) | −1.97 | −5.54 | −5.36 | −5.30 | 7.78 | 5.17 | 4.67 | 0.40 |
| $E^{for}$ (meV/atom) | | −44.0 | −80.0 | −88.0 | −110.0 | −114.0 | −112.0 | |

For $Ce_2Co_{17}$ the calculated total (spin+orbital) magnetization of 25.88$\mu_B$ per formula unit is in very good agreement with the measured value of 26.6$\mu_B$. Similar to numerous other rare earth magnets, the Ce spin magnetic moment prefers to be anti-aligned with respect to Co with an average spin moment of −0.66$\mu_B$, and −0.96$\mu_B$ for the Fe and Co end-members, respectively. In accordance with Hund's third rule, the Ce orbital moment is anti-parallel with spin moment. For $Ce_2Co_{17}$ the present calculations found a small uniaxial magnetic anisotropy of ~0.4 MJ/m$^3$, which is in excellent agreement with the 5K measured experimental value of 0.55 MJ/m$^3$. This MAE value is substantially lower than the ~4.5 MJ/m$^3$ MAE for the state of the art permanent magnet $Nd_2Fe_{14}B$ and renders this material unsuitable as a hard permanent magnet. For completeness the magnetic properties of $Ce_2Fe_{17}$ and $Ce_2Co_{17}$ under Zr substitution were also calculated, which are described in Table 1 above.

The effects of Zr substitution on the structural and magnetic properties of $Ce_2Fe_{17}$ and $Ce_2Co_{17}$ are as follows. The nearest neighbor distances between Ce and various Co/Fe sites with and without Zr substitution can be shown via a heat-map. In the base structure ($Ce_2Fe_{17}$ or $Ce_2Co_{17}$) the Fe(Co)-18f-site is the first nearest neighbor (NN) of Ce, followed by Fe(Co)-9d and Fe(Co)-18h sites. Upon Zr substitution at the dumbbell site, for both $Ce_2Fe_{17}$ and $Ce_2Co_{17}$ the distance between Ce and Co(Fe) 18f-site is significantly decreased. A reduction can also be seen in the distances between the Ce and Fe(Co) 9d-sites. Whereas the distances between Ce—Fe(Co) 18h and Ce—Ce sites increase. In particular these Ce—NN distances are comparable to those in $CeFe_5$ (1stNN: 2.806 Å; 2ndNN: 3.147 Å) and $CeCo_5$ (1stNN: 2.845 Å, 2ndNN: 3.179 Å). Upon $Co_2$→Zr substitution the spin magnetic moment of the 3d-9d site increases by 0.46$\mu_B$ to 1.54$\mu_B$, and the moment on the 3d-18f site decreases by 0.19$\mu_B$. As expected, due to substitution of a non-magnetic element the total magnetic moment for $Ce_2Co_{15}Zr$ reduces to 21.14$\mu_B$ per formula unit.

In agreement with previous studies, the present results found that for $Ce_2Co_{15}Zr$ the MAE increases to 4.67 MJ/m$^3$, which is ten times higher than the corresponding value for $Ce_2Co_{17}$. Experimental measurements for a sample of stated composition $Ce_2Co_{16}Zr$ show a MAE of 3.13 MJ/m$^3$ and saturation magnetization of 20$\mu_B$ per formula unit at 77 K. These values are captured in the present calculations ($M_s$=21.72$\mu_B$ per formula unit, and MAE=4.7 MJ/m$^3$) where one Zr atom replaces $Co_2$ dumbbell (Zr→$Co_2$). Note that the calculated magnetic properties by replacing both $Co_2$ dumbbell atoms by Zr atoms is only 0.95 MJ/m$^3$. This is much smaller than the measured experimental value and strongly suggests that Zr most likely substitutes for 2 Co at the dumbbell site.

As described above, although the MAE of $Ce_2Co_{17}$ can be improved by Zr substitution, it significantly reduces the magnetization. Next, the improvement of the magnetic properties of $Ce_2Fe_{15}Zr$/$Ce_2Co_{15}Zr$ by Co/Fe alloying is discussed. Magnetic properties as a function of various composition ranges between $Ce_2Fe_{15}Zr$ and $Ce_2Co_{15}Zr$ were presently studied within the virtual crystal approximation (VCA). Within VCA, the random atom occupation between two types of atoms is treated by using an averaged charge virtual atom. In order to model the alloyed compound, the lattice parameters within the composition range were scaled according to Vegard's law, which are listed in Table 1. Using these lattice parameters at each alloy composition, the atomic positions were optimized until forces were less than 1 mRy/Bohr. The computed magnetic properties at various Co concentrations are listed in Table 1. As shown in FIGS. 1(*a*) and 1(*b*), while with Co doping the total magnetic moment of the system generally decreases, it still maintains a significant value of 27.15$\mu_B$ per formula unit for $Ce_2Fe_6Co_9Zr$ alloy (black boxes, "Co doping VCA"; x=9). This value of total magnetic moment is only 1.1 times smaller than that of the end member compound $Ce_2Fe_{15}Zr$, and 1.3 times higher than the magnetic moment of $Ce_2Co_{15}Zr$. It was presently found that for $Ce_2ZrFe_{15-x}Co_x$, when Co doping is less than 40% (x<6) the MAE remains planar, and as the Co substitution exceeds 40% (x>6) the MAE switches to uniaxial. The highest uniaxial anisotropy, with MAE=7.78 MJ/m$^3$ occurs for 60% Co doping in $Ce_2Fe_6Co_9Zr$ alloy. This MAE is 1.6 times larger than the MAE of $Ce_2Co_{15}Zr$. These calculated properties show that $Ce_2ZrFe_{15-x}Co_x$ alloys may exhibit performance comparable to the state of art permanent magnets.

Next, in order to understand this enhancement in MAE, the density of states (DOS) was analyzed at various Co concentrations in $Ce_2ZrFe_{15-x}Co_x$. The DOS near the Fermi level predominantly originates from Ce f- and Fe/Co d-states. The Ce-f states are partially occupied in the spin-down channel, and empty in the spin-up channel, confirming that the Ce spin moment anti-aligns with Fe/Co spin moments. Further, although the Zr DOS at Fermi level is relatively small, there is some hybridization present with the neighboring Ce and Co atoms. The magnetic properties of Ce-transition metal compounds are shown to be sensitive to the valence of Ce. Though, the accurate Ce-f valence in Ce-transitional metal is still debatable, previous studies report the occurrence of mixed Ce valency. In particular, for $Ce_2Fe_{17}$ and $Ce_2Co_{17}$, the X-ray absorption spectroscopy analysis suggests a Ce valence between 3.0 to 3.3.

Perhaps the most intriguing feature of the DOS is the modification of the Ce valence by varying Co concentration. For $Ce_2ZrFe_{15-x}Co_x$, when the Co doping is less than 40% (x<6) the main localized Ce-f states are situated above the Fermi level with the band tail extending below Fermi level. This indicates tetravalency of Ce in these particular alloys. As the Co doping exceeds 40% (x>6), some of these localized Ce-f states shift below the Fermi level, which should correspond to trivalent Ce. This switching of Ce valency on Co concentration can be correlated with calculated Ce spin ($M_{SPIN}$) and orbital magnetic moments ($M_{ORB}$). As the Ce-valency switches from tetravalent ($Ce^{4+}$) to trivalent ($Ce^{3+}$) both spin and orbital magnetic moment exhibit significant increases. For example, in $Ce_2ZrFe_{15}$ (where Ce is in tetravalent state) the spin and orbital moments are $-0.48\mu_B$ and $0.18\mu_B$, respectively. For 40% Co doping, the Ce spin and orbital moments increase (in magnitude) to $-0.92\mu_B$ and $0.57\mu_B$. This behavior is consistent with the fact that the $Ce^{3+}$ is more magnetic than $Ce^{4+}$. The sharp increase in magnetic anisotropy energy along with magnetic moments supports Ce-valence fluctuation as a function of Co concentration in these alloys.

To explain the calculated enhancement of magnetic properties, the anisotropy of the orbital magnetic moment was also presently analyzed. The Co/Fe orbital magnetic moments are averaged over all the sites. The anisotropy of orbital moments ($\Delta M_{ORB}$) was computed by taking the difference between orbital magnetic moment along the c and a directions. Both Ce and Fe/Co sites exhibit substantial orbital magnetic anisotropy, which increases with Co concentration. With increasing Co doping the relatively small value of $MCe_{ORB}=-0.07$ ($MFe_{ORB}=-0.008$) in $Ce_2ZrFe_{15}$ increases to 0.142 (0.03) for 60% Co doping (in $Ce_2Fe_6Co_9Zr$). Both $MCe_{ORB}$ and $MFe_{ORB}$ exhibit a non-monotonic dependence on Co concentration, and exhibit maxima at 40% and 60% doping, respectively. According to Bruno's theorem, the MAE is directly proportional to anisotropy of orbital magnetic moment. As suggested by Bruno's formula, the MAE and orbital moments anisotropy exhibit nearly the same dependence on Co concentration. If the interaction between Ce and transition metal sub lattice can be ignored, the MAE can be linearly expanded in terms of Ce and transition metal sub lattice. Given that the strength of SOC for 4f rare-earth elements is an order of magnitude larger than that of Fe/Co, it indicates that a sizable fraction of the MAE will originate from Ce site. At the same time the substantial $MF/Co_{ORB}$ suggests that Fe/Co will also have some valuable contribution to MAE. This is in accord with the substantial uniaxial anisotropy of $CaCu_5$ structure materials such as $LaCo_5$ and $YCo_5$, which entirely lack the 4f electrons usually believed necessary to create large magnetic anisotropies.

The magnetic properties calculated above show substantial potential for application as permanent magnets. However, as shown in previous studies, VCA can overestimate the MAE. Therefore, to confirm the improved MAE under Co alloying, modeling Co doping within a super-cell approach was also performed, the results of which are also shown in FIGS. 1(*a*) and 1(*b*) as open squares and open triangles ("Supercell Co doping"). The Fe atoms were replaced by Co atoms to form the various $Ce_2ZrFe_{15-x}Co_x$ type alloy compositions. In total, four alloy compositions were studied by replacing 3, 6, 9, and 12 Fe atoms by Co. Due to the large number of inequivalent atomic sites, utilizing a super-cell based method for MAE calculation is a computationally expensive task. Hence, presently only the cells where the rhombohedral symmetry was preserved were studied. For this purpose, the sites for Co doping were selected such that the crystallographic site symmetry was preserved. This procedure results in one, two, two, and one configuration for 20, 40, 60, and 80% Co doping. After Co substitution, atomic positions in all the structures were relaxed until forces were less than 1 mRy/Bohr. Subsequently, the lowest energy structure (for 40 and 60% Co doping case) was used for magnetic property calculations. For the 60% Co case, which is identified as the optimal alloy, this structure is some 100 meV lower than the other considered structure so that this structure is significantly favored energetically. As expected, both the super-cell and VCA methods produce nearly the same magnetic moments. The situation however, is somewhat different for MAE, where it was observed that MAE switches from planar to uniaxial at 60% Co doping for the super-cell method, as opposed to 40% as observed with VCA method. Within the super-cell method, at 60% Co doping the calculated MAE is ~5.8 $MJ/m^3$, a bit smaller than the VCA value of 7.8 $MJ/m^3$. Nonetheless, for 60% and higher Co concentration, the calculated MAE within the super-cell and VCA methods are in reasonable agreement.

To get insight into the stability of these alloys, the formation energies ($E^{for}$) with respect to elemental decomposition were also calculated and are listed in Table 1 above. It was observed that all compounds studied here have negative formation energy, indicating that all alloys are stable against elemental decomposition. Among the systems explored herein, $Ce_2ZrFe_{15}$ shows the least formation energy of −44 meV/atom, whereas the formation energy of $Ce_2ZrCo_{15}$ is −112 meV/atom. Interestingly, with increasing x (Co concentration) in $Ce_2ZrFe_{15-x}Co_x$ the formation energy at x=9 (at 60% Co doping) becomes −110 meV/atom, which is comparable to $Ce_2ZrCo_{15}$. This finding of substantial negative formation energy on the Co-rich side of the alloy is a strong indication of the likely experimental feasibility of synthesis of these compounds.

One may make a projection of the potential energy product $BH_{max}$ of suitably optimized alloys in this family from these results. The T=0 magnetization M of our $Ce_2Fe_6Co_9Zr$ alloy, at $27.15\mu_B$ per formula unit, on a volumetric basis is some 1.26 Tesla. Given the calculated magnetic anisotropy constant $K_1$ of 7.78 $MJ/m^3$, the magnetic hardness parameter a takes the value of 6.19>>1, indicating that the maximum possible energy product of 40 MG-Oe, should be achievable at low temperature. At the technologically relevant room temperature, with a slightly smaller moment this value would be closer to 32 MG-Oe, assuming a 10 percent reduction in $M_s$ at room temperature. While no detailed study of the Curie point of these alloys was made, previous work has found the Curie point of Zr-alloyed $Ce_2Co_{17}$ to be of order of 900 K, so only a small magnetization reduction due to temperature effects is anticipated.

There is a compensating factor, however, that makes the 300 K achievable performance in this alloy system more likely to be the 40 MG-Oe amount. The κ value quoted above, derived largely from the distortion of the 2-17 structure towards the 1-5 structure by Zr, is sufficiently large that smaller concentrations of Zr than the full substitution (approximately 7.5 percent by weight) modeled herein may well produce optimal performance. This is in fact known from previous work on $Sm_2Co_{17}$-based magnets, for which typical mass concentrations of magnets in actual usage are on the order of 3 weight percent. As noted above, Zr (due largely to its substituting for two 3d atoms) has a disproportionate effect on the magnetic moment, and so one may envision an alloy composed of effectively equal proportions of the presently disclosed $Ce_2Fe_6Co_9Zr$ discussed in detail herein and $Ce_2(Fe_{0.4}Co_{0.6})_{17}$ as a means of simulating lower Zr content. Since magnetic anisotropy is generally an atomic-level quantity, the magnetic anisotropy of such an alloy should be approximately the mean of these two quantities, which was presently found to be 3.6 MJ/m$^3$, so that sufficient magnetic anisotropy for a strong permanent magnet still exists. A similar argument can be made concerning the magnetization, and it was presently found from direct calculation that the magnetization of $Ce_2(Fe_{0.4}Co_{0.6})_{17}$ is some 32.5$\mu_B$/formula unit, so that the magnetization of the present lower-Zr alloy (averaging these two components) would be some 1.4 T at low temperature, or likely approximately 1.26 T or larger at room temperature. The original potential energy product of this alloy of 40 MG-Oe would then be obtained, but in this case at room temperature. As with present SmCo-based magnets, the much higher likely Curie point than $Nd_2Fe_{14}B$ (585 K) means that above room temperature the presently disclosed magnets would likely outperform Nd-based magnets by a substantial margin.

In summary, a detailed study of the magnetic properties of $Ce_2Fe_{17}$ and $Ce_2Co_{17}$ under Zr substitution at the dumbbell site was carried out by performing first principles calculations. While it was found that Zr doping has no favorable effect on the MAE of $Ce_2Fe_{17}$, consistent with previous reports, for $Ce_2Co_{17}$ it was shown that MAE can be significantly improved by one Zr substitution at the $Co_2$ dumbbell site. In order to further improve the magnetic properties, the saturation magnetization and MAE were calculated, at a few selected concentrations between $Ce_2Fe_{15}Zr$ and $Ce_2Co_{15}Zr$ within the VCA method. It was shown that the MAE can be significantly tuned by varying the Co concentration, and switches from planar to uniaxial at 40% Co doping. The calculated MAE exhibits a strong dependence on Co concentration, and peaks at 60% Co doping (in $Ce_2Fe_9Co_6Zr$), which is more than two times higher than the MAE value calculated in the end compound $Ce_2Co_{15}Zr$. Very importantly, $Ce_2Fe_9Co_6Zr$ still maintains a relatively high value of saturation magnetization (~1.3 times higher than of $Ce_2Co_{15}Zr$). These calculations suggests the 60% Co Zr-alloyed material has potential room temperature energy products as high as 40 MG-Oe and likely better temperature dependence than $Nd_2Fe_{14}B$. By analyzing the electronic density of states, the switching of MAE from planar to uniaxial in $Ce_2ZrFe_{15-x}Co_x$ was found to be likely related to Ce valence fluctuations in these compounds. For a Co concentration less than 40%, Ce was found to be in a tetravalent state, and for 40% or higher Co doping Ce switched to trivalent. This is further corroborated by the observed enhancement in Ce spin and orbital magnetic moments.

Examples

The present permanent magnet materials are further described in connection with the following laboratory examples, which are intended to be non-limiting.

$Ce_2ZrCo_9Fe_6$, $Ce_2ZrCo_9Fe_3Cu_3$, and $Ce_{2.4}Zr_{0.6}Co_9Fe_3Cu_3$ were fabricated both by casting and by melt spinning. The initial alloy for the melt-spun materials synthesis had 2% by weight TiC, although the amount of TiC may be in the range of approximately 0 to 4% by weight. A detailed description of the procedure used follows:

Ingot of the alloys $Ce_2ZrCo_9Fe_6$ (001), $Ce_2ZrCo_9Fe_3Cu_3$ (002) and $Ce_{2.4}Zr_{0.6}Co_9Fe_3Cu_3$ (003) were prepared by arc-melting the constituent elements in argon atmosphere. The ingots were subsequently wrapped in tantalum foils, sealed inside silica ampoules that had been evacuated and back-filled with ⅓ of an atmosphere of ultrahigh purity argon and annealed at 1173 K. After 7 days, the quartz tubes containing the ingots were water quenched to room temperature. Magnetization as a function of magnetic field was measured for the samples at 300 K using a Quantum Design superconducting quantum interference device magnetometer, the results of which are shown in FIG. 2.

Figure 3:
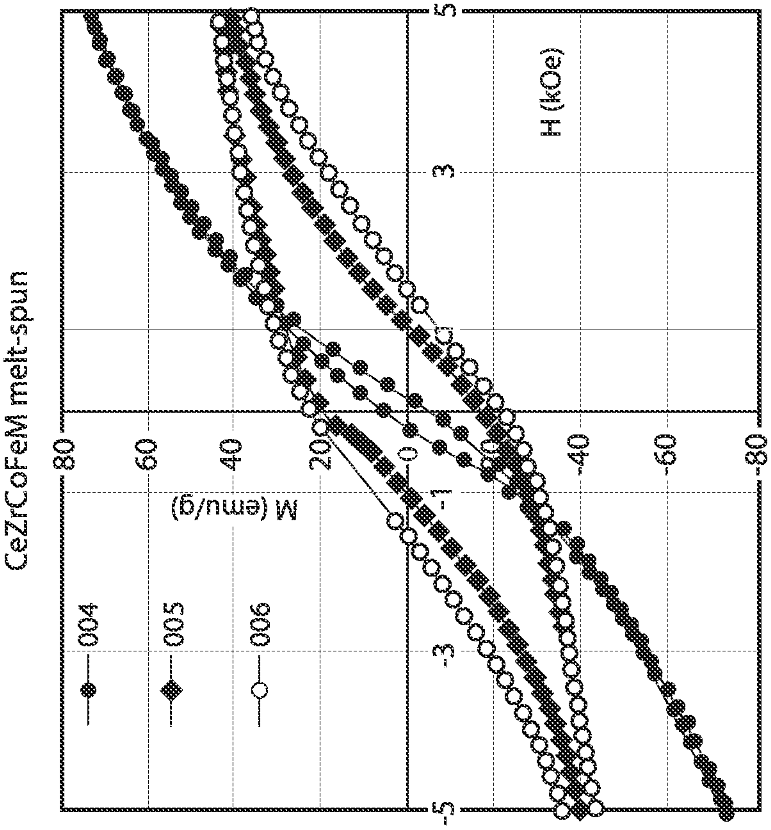
FIG. 3 is another graph of the total magnetization of certain embodiments of the permanent magnet materials as a function of magnetic field strength.

Ingot of the alloys $Ce_2ZrCo_9Fe_6$+2 wt. % TiC (004), $Ce_2ZrCo_9Fe_3Cu_3$+2 wt. % TiC (005) and $Ce_{2.4}Zr_{0.6}Co_9Fe_3Cu_3$+2 wt. % TiC (006) were prepared by arc-melting the constituent elements in argon atmosphere. Melt-spun ribbons were prepared by inductively melting the ingots, contained in quartz crucibles with ⅓ atmosphere of high purity He gas and the melts were ejected through a 0.8 mm orifice onto a single copper wheel at rotating at 25 m/s surface velocity. The ribbons were subsequently wrapped in tantalum foils, sealed inside silica ampoules that had been evacuated and back-filled with ⅓ of an atmosphere of ultrahigh purity argon and annealed at 1023 K. After 2 hours, the quartz tubes containing the ribbons were water quenched to room temperature. Magnetization as a function of magnetic field was measured for the samples at 300 K using a Quantum Design superconducting quantum interference device magnetometer, the results of which are shown in FIG. 3.

Figure 2:
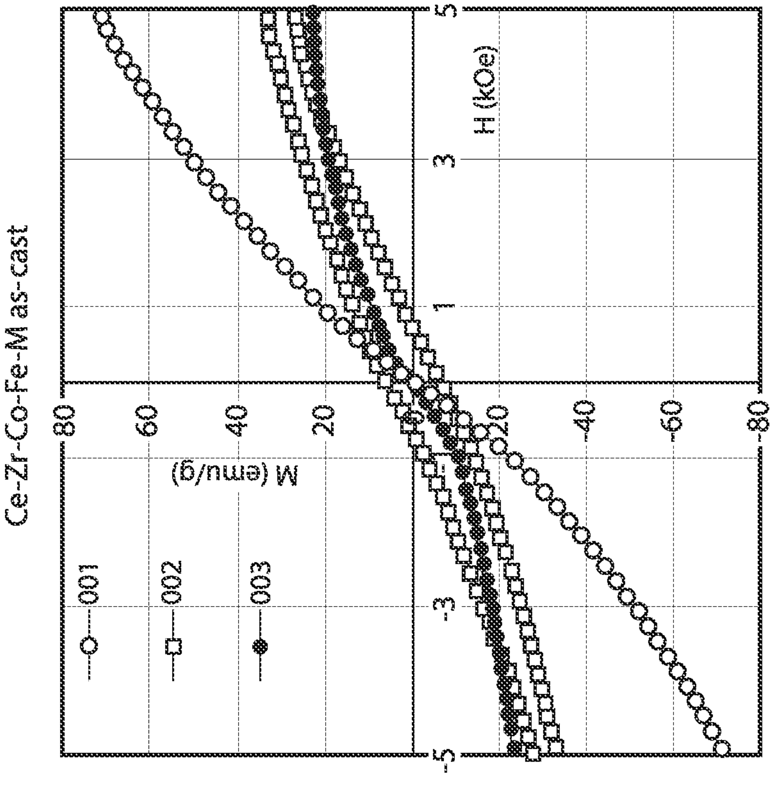
FIG. 2 is a graph of the total magnetization of certain embodiments of the permanent magnet materials as a function of magnetic field strength.

FIG. 2 indicates that the coercivity of $Ce_2ZrCo_9Fe_3Cu_3$ was greater than that of $Ce_{2.4}Zr_{0.6}Co_9Fe_3Cu_3$ and $Ce_2ZrCo_9Fe_6$. Similarly, FIG. 3 indicates that the coercivity of $Ce_2ZrCo_9Fe_3Cu_3$ and $Ce_{2.4}Zr_{0.6}Co_9Fe_3Cu_3$ was greater than that of $Ce_2ZrCo_9Fe_6$ when these materials were melt-spun with 2 weight % TiC. Additionally, comparing the results shown in FIG. 2 with FIG. 3, the coercivity of all three of the materials were improved by melt-spinning with TiC.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A permanent magnet material comprising a compound having the formula $Ce_2ZrFe_{15-x}Co_x$ wherein 6≤x≤14 in the formula, the permanent magnet material having a magnetic anisotropy greater than 2 $MJ/m^3$.

2. The permanent magnet material of claim 1, wherein x=9.

3. The permanent magnet material of claim 1, wherein Ce is in a trivalent ($Ce^{3+}$) state.

4. The permanent magnet material of claim 1, wherein the material has a total magnetization of greater than $21\mu_B$ per formula unit.

5. The permanent magnet material of claim 1, wherein the material has an energy of formation ($E^{for}$) less than −80.0 meV/atom.

6. The permanent magnet material of claim 1, wherein the material has a maximum energy product ($BH_{max}$) of greater than 30 MGOe.

7. A permanent magnet comprising the permanent magnet material of claim 1.

8. The permanent magnet of claim 7, wherein the permanent magnet further comprises one or more of Hf, Ti, Ni, and inadvertent impurities.

9. A permanent magnet material comprising:

a compound having the formula $Ce_2ZrFe_{15-x}Co_x$ wherein 6≤x≤14 in the formula, the permanent magnet material having a magnetic anisotropy greater than 2 $MJ/m^3$, and wherein one or more of Hf, Ti, and W is partially substituted for Zr.

10. A permanent magnet material comprising:

TiC in an amount in the range of between 0 and 4% by weight; and the balance a compound having the formula $Ce_2ZrFe_{15-x}Co_x$ wherein 6≤x≤14 in the formula;

wherein the permanent magnet material has a magnetic anisotropy greater than 2 $MJ/m^3$.

11. A permanent magnet material comprising a compound having the formula $Ce_{2+y}Zr_{1-y}Fe_{(15-x)(2-z)/2}Co_xCu_{((15-x)z/2)}$ wherein x=9, y=0.4, and z=1.

12. A permanent magnet comprising the permanent magnet material of claim 11.

13. The permanent magnet of claim 12, wherein the permanent magnet further comprises one or more of Hf, Ti, Ni, and inadvertent impurities.

* * * * *